(12) United States Patent
Taniguchi et al.

(10) Patent No.: US 10,587,941 B2
(45) Date of Patent: Mar. 10, 2020

(54) MICROPHONE COOPERATION DEVICE

(71) Applicant: Kabushiki Kaisha Toshiba, Minato-ku, Tokyo (JP)

(72) Inventors: Toru Taniguchi, Kanagawa (JP); Taira Ashikawa, Kanagawa (JP); Terufumi Morishita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/908,178

(22) Filed: Feb. 28, 2018

(65) Prior Publication Data
US 2019/0069062 A1 Feb. 28, 2019

(30) Foreign Application Priority Data

Aug. 29, 2017 (JP) .................................. 2017-164358

(51) Int. Cl.
| | | |
|---|---|---|
| *H04R 1/08* | (2006.01) | |
| *H04R 3/00* | (2006.01) | |
| *H04R 1/22* | (2006.01) | |
| *G06F 3/048* | (2013.01) | |
| *H04R 27/00* | (2006.01) | |

(52) U.S. Cl.
CPC .............. *H04R 1/083* (2013.01); *H04R 1/222* (2013.01); *H04R 3/005* (2013.01); *G06F 3/048* (2013.01); *H04R 27/00* (2013.01); *H04R 2227/003* (2013.01)

(58) Field of Classification Search
CPC ................ H04L 5/1438; H04W 12/06; H04W 12/00504; H04W 12/00; H04R 1/083; H04R 1/22; H04R 3/005; H04R 27/00; H04R 2227/003; G06F 3/048
See application file for complete search history.

(56) References Cited

U.S. PATENT DOCUMENTS

| | | | | |
|---|---|---|---|---|
| 4,013,840 A | * | 3/1977 | Anderson | H03L 7/199 331/1 A |
| 6,850,609 B1 | * | 2/2005 | Schrage | H04M 3/42221 379/158 |
| 6,917,911 B2 | * | 7/2005 | Schultz | H04M 3/493 704/206 |
| 8,526,921 B2 | * | 9/2013 | Haaramo | H04M 3/42382 370/260 |
| 8,795,138 B1 | | 8/2014 | Yeh et al. | |
| 9,667,284 B1 | * | 5/2017 | Gean | H04W 4/10 |
| 9,894,489 B2 | * | 2/2018 | Johnson | H04W 4/043 |

(Continued)

FOREIGN PATENT DOCUMENTS

| | | |
|---|---|---|
| JP | 2013-102427 A | 5/2013 |
| JP | 2015-061318 | 3/2015 |

(Continued)

*Primary Examiner* — Fan S Tsang
*Assistant Examiner* — Angelica M McKinney
(74) *Attorney, Agent, or Firm* — Knobbe, Martens, Olson & Bear, LLP (57) ABSTRACT

According to one embodiment, a microphone cooperation device includes a first device including a first microphone and a first speaker, and a second device including a second microphone and a second speaker. The first device and the second device are capable of a first action of joining a group of devices when the second microphone receives a first sound wave emitted from the first speaker.

17 Claims, 4 Drawing Sheets

(56) References Cited

U.S. PATENT DOCUMENTS

| | | | |
|---|---|---|---|
| 2010/0227549 A1* | 9/2010 | Kozlay | H04L 9/3226 455/26.1 |
| 2012/0214416 A1* | 8/2012 | Kent | H04W 4/21 455/41.2 |
| 2013/0106976 A1 | 5/2013 | Chu et al. | |
| 2013/0152139 A1* | 6/2013 | Davis | H04N 21/482 725/61 |
| 2015/0079562 A1 | 3/2015 | Yeh et al. | |
| 2015/0081209 A1 | 3/2015 | Yeh et al. | |
| 2015/0119067 A1* | 4/2015 | Lavery | H04W 64/003 455/456.1 |
| 2015/0128240 A1* | 5/2015 | Richards | H04L 63/0861 726/7 |
| 2015/0312419 A1 | 10/2015 | Yoneda et al. | |
| 2015/0318874 A1* | 11/2015 | Donaldson | H04W 4/21 367/135 |
| 2016/0033615 A1 | 2/2016 | Nakamura et al. | |
| 2016/0140952 A1* | 5/2016 | Graham | G10L 13/033 704/260 |
| 2016/0150575 A1* | 5/2016 | Andersen | H04W 76/10 370/329 |
| 2017/0078490 A1* | 3/2017 | Kaminsky | H04M 11/06 |

FOREIGN PATENT DOCUMENTS

| | | | |
|---|---|---|---|
| JP | 2015-215601 A | 12/2015 | |
| JP | 2016-035443 | 3/2016 | |

* cited by examiner

MICROPHONE COOPERATION DEVICE

CROSS-REFERENCE TO RELATED APPLICATIONS

This application is based upon and claims the benefit of priority from Japanese Patent Application No. 2017-164358, filed on Aug. 29, 2017; the entire contents of which are incorporated herein by reference.

FIELD

Embodiments described herein relate generally to a microphone cooperation device.

BACKGROUND

Microphones are provided in various electronic devices such as, for example, mobile telephones, tablet computers, etc. Information (data) that is acquired by the microphones is used in various processing. It is desirable to be able to provide more effectively utilization of the information acquired by the microphones.

DETAILED DESCRIPTION

According to one embodiment, a microphone cooperation device includes a first device including a first microphone and a first speaker, and a second device including a second microphone and a second speaker. The first device and the second device are configured to implement a first action of joining a group of devices when the second microphone receives a first sound wave emitted from the first speaker.

Various embodiments will be described hereinafter with reference to the accompanying drawings.

In the specification and drawings, components similar to those described or illustrated in a drawing thereinabove are marked with like reference numerals, and a detailed description is omitted as appropriate.

First Embodiment

Figure 1:
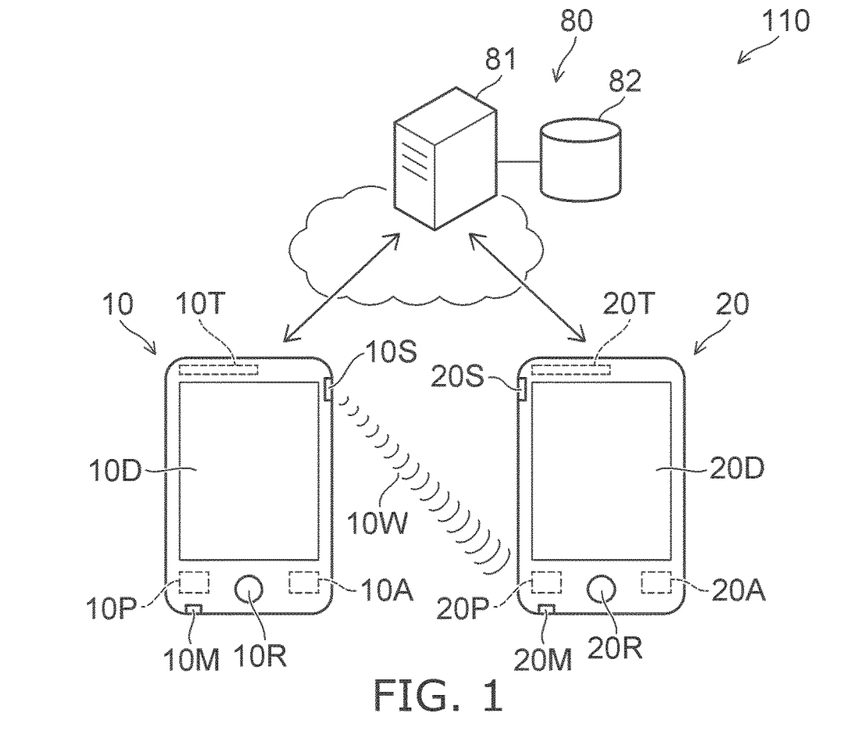
FIG. 1 is a schematic view illustrating a microphone cooperation device according to a first embodiment.

FIG. 1 is a schematic view illustrating a microphone cooperation device according to a first embodiment.

As shown in FIG. 1, the microphone cooperation device 110 according to the embodiment includes a first device 10 and a second device 20. A server 80 is further provided in the example.

The first device 10 includes a first microphone 10M and a first speaker 10S. The second device 20 includes a second microphone 20M and a second speaker 20S. At least one of the first device 10 or the second device 20 is, for example, a portable terminal device. At least one of the first device 10 or the second device 20 is, for example, a smartphone or a computer (including a tablet computer). At least one of the first device 10 or the second device 20 may be, for example, a wristwatch-type, an eyeglasses-type, etc. The configurations of these devices are arbitrary.

The first device 10 may further include a first communicator 10T, a first memory 10A, a first processor 10P, a first displayer 10D, and a first operation receiver 10R. The second device 20 may further include a second communicator 20T, a second memory 20A, a second processor 20P, a second displayer 20D, and a second operation receiver 20R.

It is possible for at least one of the first communicator 10T or the second communicator 20T to communicate with, for example, the server 80, etc. For example, the communication may be performed using any wired or wireless method. For example, the communication is performed using an electromagnetic wave (including a radio wave, light, infrared, etc.). For example, the communication is implemented by a communication path including an internet line.

The first memory 10A can store at least a portion of a program relating to the actions implemented by the first device 10. For example, the first memory 10A may store at least a portion of sound data (first sound information) acquired by the first microphone 10M. The second memory 20A can store at least a portion of a program relating to the actions implemented by the second device 20. For example, the second memory 20A may store at least a portion of sound data (second sound information) acquired by the second microphone 20M. The first and second memory 10A and 20A may store at least a portion of information acquired from another device.

The first processor 10P controls the actions implemented by the first device 10. For example, the actions of the first processor 10P are implemented based on at least a portion of the program stored in the first memory 10A. The second processor 20P controls the actions implemented by the second device 20. For example, the actions of the second processor 20P are implemented based on at least a portion of the program stored in the second memory 20A. For example, the processing of the sound data acquired by the microphone may be processed by these processors. For example, the production of sounds from the speakers may be performed by controls of these processors. These processors are, for example, controllers.

Displays are possible in the first displayer 10D and the second displayer 20D. Other than the display functions, these displayers may have input functions. These displayers may be, for example, "touch panel-type" input devices. These displayers may function as interfaces (e.g., GUIs (Graphical User Interfaces)) for a user of the first device 10 or the second device 20.

It is possible for the first operation receiver 10R and the second operation receiver 20R to receive operations performed by the users. These operation receivers may include, for example, switches (mechanical switches, electromagnetic switches, or optical switches), etc. These operation receivers may have authentication functions of the users.

The server 80 includes, for example, a server processor 81 and a server memory 82. For example, it is possible for the server 80 to communicate with at least one of the first device 10 or the second device 20. The server 80 is capable of supplying data to these devices. The server 80 is capable of acquiring data from these devices. The server 80 may be capable of controlling these devices. At least a portion of these actions implemented by the server 80 is controlled by the server processor 81. For example, at least a portion of the program for the actions of the server processor 81 is stored in the server memory 82. At least a portion of the data obtained from the first device 10 and the second device 20 is stored in the server memory 82. At least a portion of the data supplied to the first device 10 and the second device 20 may be stored in the server memory 82.

In the embodiment, the communication between the first device 10 and the second device 20 may be implemented without going through the server 80. In such a case, for example, communication is performed using a P2P (Peer to Peer) connection. The communication between the first device 10 and the second device 20 may be implemented via the server 80. In such a case, the communication is performed using, for example, a CSS (Client Server System) connection.

The following first action is possible in the microphone cooperation device 110 according to the embodiment. In the first action, a first sound wave 10W is emitted from the first speaker 10S of the first device 10. In the first action, the first device 10 and the second device 20 join one group when the second microphone 20M of the second device 20 receives the first sound wave 10W.

In the embodiment, multiple devices (the first device 10, the second device 20, etc.) are grouped. For example, the multiple devices are in a handshaking state. The actions of the multiple devices (the first device 10, the second device 20, etc.) are brought into cooperation by these multiple devices joining the one group.

For example, the first device 10 and the second device 20 are placed inside one room. The user of each of these devices participates in a meeting in the room. In such circumstances, the first sound information acquired by the first microphone 10M and the second sound information acquired by the second microphone 20M can be utilized as one set by the first device 10 and the second device 20 belonging to the same group.

For example, sound information in which the noise is suppressed can be obtained by, for example, processing the first sound information and the second sound information. For example, there are cases where it is difficult to acquire with high quality the remarks of the multiple participants participating in the meeting by using one microphone. In such a case, by the first device 10 and the second device 20 belonging to the same group, the remarks of the multiple participants can be acquired with high quality by processing the first sound information and the second sound information.

For example, text information can be derived from sound information by performing voice recognition of the sound information acquired by the microphones. In such a case, higher quality text information can be obtained by recognizing that the multiple sound information (the first sound information and the second sound information) acquired by the multiple microphones belongs to the one group.

In the embodiment, the first action recited above is performed when the multiple devices join one group. In the first action, the first sound wave 10W is emitted from the first speaker 10S of the first device 10.

The first sound wave 10W that is emitted from the first device 10 reaches an appropriate spatial range. For example, the first sound wave 10W reaches the interior of the room in which the meeting is performed. Another device (the second device 20) that is placed inside the room is capable of receiving the first sound wave 10W. Even if another device is placed outside the room, the first sound wave 10W does not easily reach such a device. Therefore, the grouping inside the one room can be implemented more appropriately.

For example, there is a reference example that performs grouping by communication (e.g., by an internet line, etc.) using an electromagnetic field (a radio wave, etc.). In such a case, the communication also reaches locations distal to the room. For example, the communication between these devices is possible even if the first device 10 is placed at an unseen position distal to the position of the second device 20. However, in the reference example, security problems occur when the grouping of the first device 10 and the second device 20 is performed easily. For example, there is a possibility of being intercepted.

Conversely, in the embodiment, the grouping of the first device 10 and the second device 20 is performed using the first sound wave 10W. By using the communication that uses the sound wave to authenticate the grouping, the distance between the multiple devices (the first device 10 and the second device 20) to be grouped is limited compared to the case of the reference example recited above. For example, the second device 20 can receive the first sound wave 10W emitted from the first device 10 when the first device 10 is placed at a position visible from the position of the second device 20. Thereby, the security problems are suppressed.

In the embodiment, the first sound wave 10W is attenuated by, for example, the walls of the room, etc. For example, the first sound wave 10W may be substantially shielded by, for example, the walls of the room.

The sound power of the first sound wave 10W is, for example, not less than $1 \times 10^{-7}$ W/m$^2$ and not more than $1 \times 10^{-4}$ W/m$^2$. In the case where the sound power is less than $1 \times 10^{-7}$ W/m$^2$, the authentication of the grouping using the first sound wave 10W is not easy. In the case where the sound power is greater than $1 \times 10^{-4}$ W/m$^2$, the users easily feel discomfort.

In the embodiment, the frequency of the first sound wave 10W is arbitrary. In one example, the frequency of the first sound wave 10W may be greater than 20 kHz. In such a case, the user substantially does not sense the first sound wave 10W.

In another example, the frequency of the first sound wave 10W is not less than 20 Hz and not more than 20 kHz. In such a case, the user senses the first sound wave 10W. In such a case, the user of the first device 10 and the user of the second device 20 can recognize that the first sound wave 10W is emitted from the first device 10. In such a case, these users easily know that the authentication for the grouping of the two devices is being implemented. Therefore, higher security is obtained.

In the embodiment, the grouping of the multiple devices can be implemented easily with higher security. The cooperation of the grouped multiple devices is easy. Thereby, the information (the sound information) that is obtained by the multiple devices can be utilized more effectively. According to the embodiment, a microphone cooperation device can be provided in which the information can be utilized more effectively.

Several examples of the action implemented by the microphone cooperation device 110 will now be described.

Figure 2:
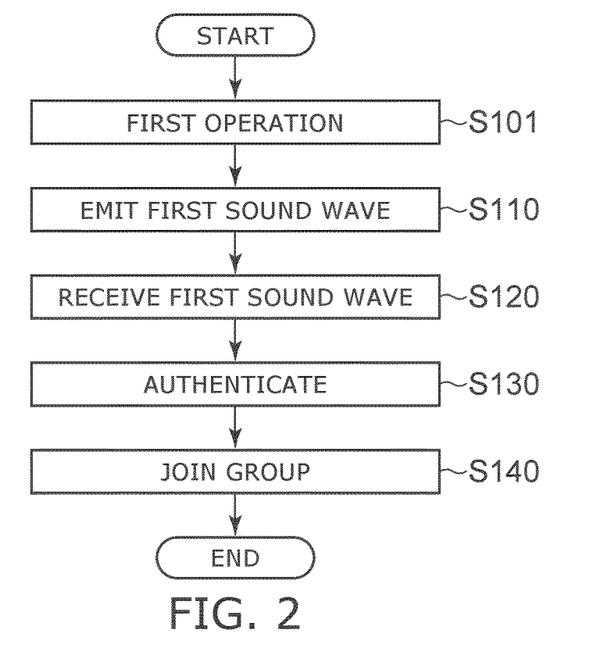
FIG. 2 is a flowchart illustrating the action of the microphone cooperation device according to the first embodiment.

FIG. 2 is a flowchart illustrating the action of the microphone cooperation device according to the first embodiment.

As shown in FIG. 2, a first operation is received by the first device 10 (step S101). For example, an image such as, for example, "Request grouping?" or the like is displayed in the first displayer 10D of the first device 10. The user (the first user) of the first device 10 touches the image and requests the grouping. Thereby, the first sound wave 10W is emitted (step S110). For example, the reception of the first operation may be the reception of an input by voice. For example, the reception of the first operation may be performed using the first operation receiver 10R (referring to FIG. 1).

Thus, in the example, the emission of the first sound wave 10W (step S110) is started by the first device 10 receiving the operation of the first operator.

The second microphone 20M of the second device 20 receives the emitted first sound wave 10W (step S120). An authentication described below is performed by the second device 20 (step S130). According to the result of the authentication, the first device 10 and the second device 20 join one group (step S140). Thus, the first action is implemented.

Figure 3:
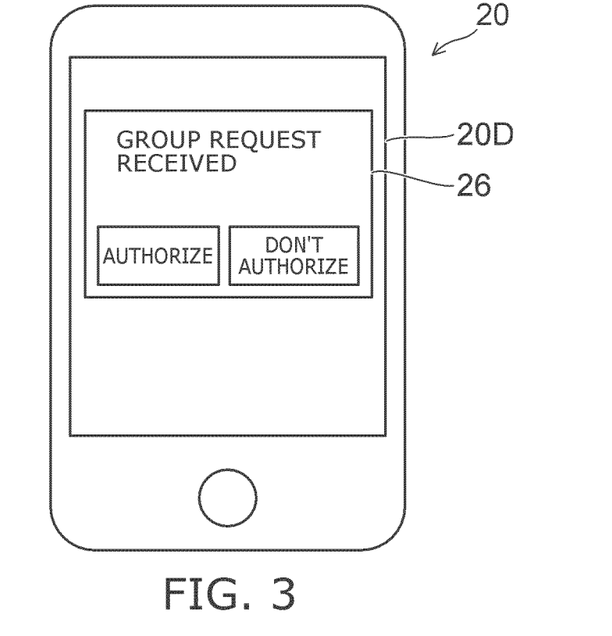
FIG. 3 is a schematic view illustrating the action of the microphone cooperation device according to the first embodiment.

FIG. 3 is a schematic view illustrating the action of the microphone cooperation device according to the first embodiment. FIG. 3 illustrates the authentication of the second device 20 recited above. In the example as shown in FIG. 3, a message 26 is displayed in the second displayer 20D of the second device 20. In the example, the message 26 includes the content of "group request received." Also, the images of "Authorize" and "Don't authorize" are displayed in the second displayer 20D. The user (the second user) of the second device 20 can recognize the group request by recognizing the message 26. Thus, the authentication of the request can be implemented easily.

Thus, the authentication action by the second device 20 may be performed based on visual information such as a display, etc. In the embodiment, the authentication action may be performed based on auditory information such as a voice, etc. In the embodiment, the authentication action may be performed based on tactile information such as a vibration, etc.

Figure 4:
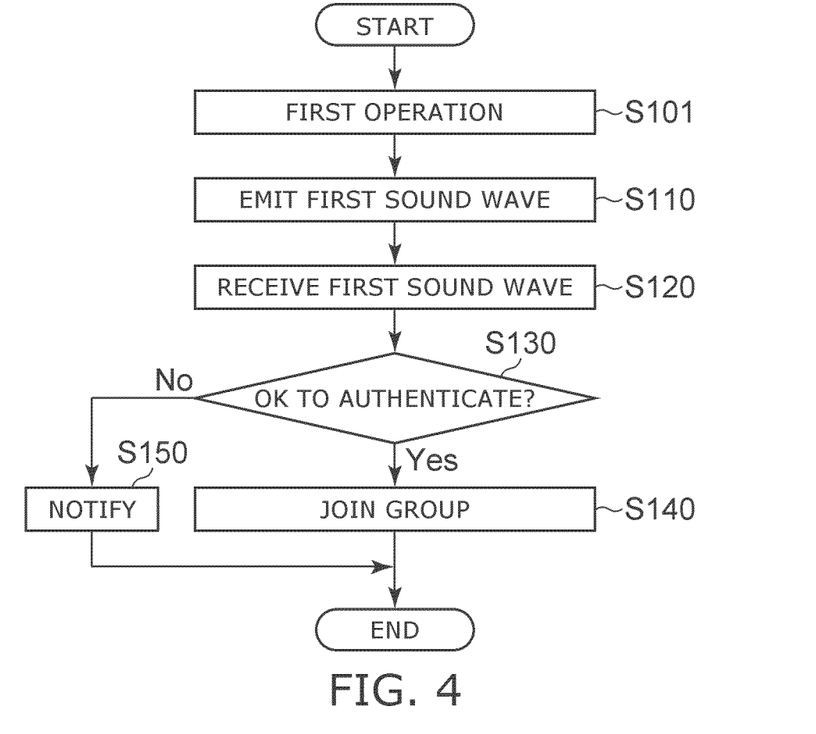
FIG. 4 is another flowchart illustrating the action of the microphone cooperation device according to the first embodiment.

FIG. 4 is another flowchart illustrating the action of the microphone cooperation device according to the first embodiment.

In the authentication of the second device 20 (step S130) as shown in FIG. 4, it is determined whether or not it is alright to authenticate. For example, the determination is determined by receiving the operation of the user (the second user) based on the display illustrated in FIG. 3, etc. For example, the images of "Authorize" and "Don't authorize" are displayed in the message 26 illustrated in FIG. 3.

In the case where the second user selects "Authorize" (i.e., the second device 20 receives the instruction (the operation) of "Authorize") in step S130, the flow proceeds to step S140.

On the other hand, in the case where the second user selects "Don't authorize" (i.e., the second device 20 receives the instruction (the operation) of "Don't authorize") in step S130, the flow proceeds to step S150. In step S150, for example, a notification is transmitted toward the first device 10. For example, the transmission may be performed by emitting a sound wave (a second sound wave) from the second speaker 20S of the second device 20. For example, the transmission may be performed by a communication via an internet line from the second device 20. For example, the transmission may be performed by a communication via the server 80.

By the transmission of the notification, for example, it is displayed in the first displayer 10D of the first device 10 that the group request was not realized. For example, the notification that the group request was not realized is performed by a display (visual information). The notification that the group request was not realized may be performed based on at least one of auditory information or tactile information.

In the embodiment, the flow may proceed to step S150 also in the case where the authorization of the authentication is not performed within a prescribed amount of time in step S130.

The first user of the first device 10 may implement the request again according to the notification that the group request was not realized. Or, the first user may not continue the request.

Thus, in one example, when the second microphone 20M of the second device 20 receives the first sound wave 10W emitted from the first device 10, the second device 20 may prompt the second operator of the second device 20 to select whether or not to implement the first action. For example, the message 26 illustrated in FIG. 3 or the like is displayed. For example, a "prompt to select" is performed based on at least one of visual information, auditory information, or tactile information.

Then, the first action is implemented when the second operator selects to implement the first action (to implement the grouping, i.e., to join the group). For example, the second device 20 acquires the information that the implementing of the first action has been selected by the second operator. The first action is implemented at this time.

As recited above, step S130 (the authentication) is performed based on the operation of the second user. In another example, step S130 (the authentication) may be determined using a condition other than the operation of the second user.

For example, in the case where a meeting is set, the participants of the meeting are preset. The participants of the meeting are pre-registered. The identification information of a device (e.g., the first device 10) possessed by one of the registered multiple participants can be acquired by a device (e.g., the second device 20) possessed by another person of the registered multiple participants. In such a case, the first sound wave 10W is emitted from the first device 10 when the first device 10 possessed by the one person of the multiple participants recited above joins the meeting room. The joining into one group by the first device 10 and the second device 20 may be authenticated based on the identification information of the first device 10 when the second device 20 receives the first sound wave 10W.

In the case where the time of the meeting is predetermined, the joining into the group may be authenticated based on the time when the second device 20 receives the first sound wave 10W. For example, the joining into the group may be authenticated based on the schedule of the first operator of the first device 10. The joining into the group may be authenticated based on the schedule of the second operator of the second device 20.

In the case where the first device 10 and the second device 20 have joined one group previously, etc., the joining into the group may be authenticated when the first sound wave 10W is received. For example, information relating to the grouping of the past of the first device 10 and the second device 20 is obtained by, for example, referring to a transmission/reception history of the communication between the first device 10 and the second device 20.

Thus, for example, the first action may be implemented based on at least one of the time when the second microphone 20M receives the first sound wave 10W, the schedule of the first operator of the first device 10, the schedule of the second operator of the second device 20, or the information relating to the transmission/reception history of the past between the first device 10 and the second device 20.

For example, the determination of the suitability of the implementation of the first action based on such information may be performed by at least one of the first device 10 or the second device 20. In the embodiment, for example, the determination of the suitability of the implementation of the first action based on such information may be performed by the server 80. For example, at least a portion of the first action may be controlled by the server 80.

On the other hand, the emission of the first sound wave 10W (step S110) may be implemented based on the time. For example, the first sound wave 10W may be emitted to match the start time of the meeting. The emission of the first sound wave 10W may be implemented based on information relating to the position of the first device 10. For example, the first sound wave 10W may be emitted when the first device 10 is inside the scheduled meeting room. The emission of the first sound wave 10W may be implemented based on the schedule of the first operator of the first device 10 (e.g., the participation in the meeting). The emission of the first sound wave 10W may be implemented based on information relating to the distance between the first device 10 and the second device 20. The first sound wave 10W may be emitted when the first device 10 and the second device 20 are in the same room and the distance between the two is not more than a threshold. The emission of the first sound wave 10W may be implemented based on the transmission/reception history of the past between the first device 10 and the second device 20 (e.g., the history of the grouping of the past).

Thus, in the embodiment, the emission of the first sound wave 10W may be started based on at least one of the time, the information relating to the position of the first device 10, the schedule of the first operator of the first device 10, the information relating to the distance between the first device 10 and the second device 20, or the information relating to the transmission/reception history of the past between the first device 10 and the second device 20. The control of the emission of the first sound wave 10W may be controlled by the server 80.

The operations by people can be omitted by starting the emission of the first sound wave 10W based on such information. More convenient microphone cooperation can be provided.

Several examples of the state (or the action) of the first device 10 and the second device 20 having microphone cooperation will now be described.

For example, it is possible to add, to the first sound information relating to the first sound acquired by the first microphone 10M after joining one group, identification information provided to the one group. Then, it is possible to add the identification information to the second sound information relating to the second sound acquired by the second microphone 20M after joining the one group.

For example, authentication information that is unique to the group is assigned to the first sound information and the second sound information. For example, the information that belongs to the group can be extracted by searching or recognizing the identification information.

For example, the first sound information relating to the first sound acquired by the first microphone 10M after joining the one group is storable. The second sound information relating to the second sound acquired by the second microphone 20M after joining the one group is storable. Stored sound information is read subsequently. In such a case, for example, it is possible to extract and read sound information based on the identification information recited above.

For example, the processing-information that is obtained by processing the first sound information recited above and the second sound information recited above may be outputtable. For example, at least a portion of the noise may be removed using the first sound information and the second sound information. Thus, the processing of the first sound information and the second sound information includes suppression processing of the noise. High-quality sound information is obtained.

Voice recognition processing of the first sound information relating to the first sound acquired by the first microphone 10M and the second sound information relating to the second sound acquired by the second microphone 20M may be performed. The sound information is converted into text information by voice recognition. By the grouping of the multiple devices (the first device 10, the second device 20, etc.), the multiple text information obtained by these multiple devices is merged as necessary.

Figure 5:
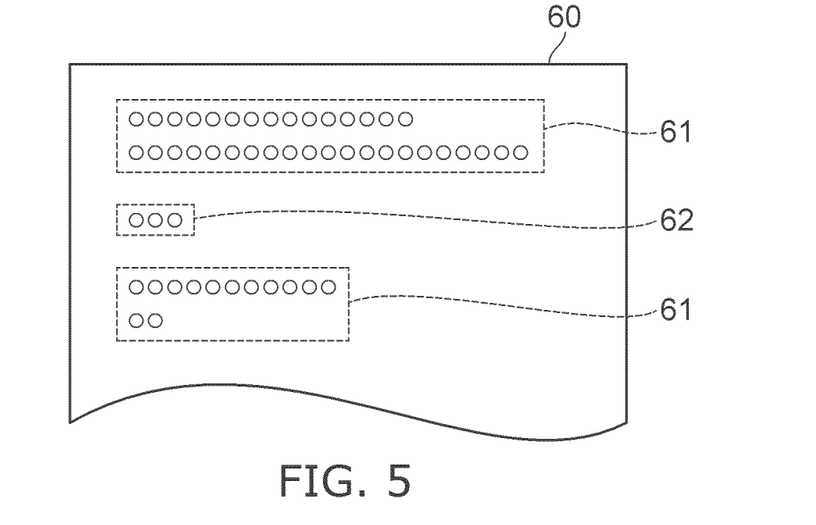
FIG. 5 is a schematic view illustrating the action of the microphone cooperation device according to the first embodiment.

FIG. 5 is a schematic view illustrating the action of the microphone cooperation device according to the first embodiment. FIG. 5 illustrates processing-information 60 obtained by the processing of the first sound information and the second sound information. In the example, the processing-information 60 includes text information. For example, the first device 10 and the second device 20 join one group in a meeting. The voice of the first user of the first device 10 is acquired mainly by the first microphone 10M of the first device 10. The voice of the second user of the second device 20 is acquired mainly by the second microphone 20M of the second device 20.

The first sound information that is acquired by the first microphone 10M includes the information of the voice of the first user. The second sound information that is acquired by the second microphone 20M includes the information of the voice of the second user. Text information is derived based on the first sound information and the second sound information.

As illustrated in FIG. 5, a first text 61 of the first user is obtained based on the first sound information. A second text 62 of the second user is obtained based on the second sound information. In the embodiment, the first device 10 and the second device 20 belong to the same group. In such a case, the first text 61 and the second text 62 are merged.

Thus, the processing-information that is obtained by the processing of the first sound information and the second sound information may include the first text information (the first text 61) obtained by the voice recognition processing of the first sound information and the second text information (the second text 62) obtained by the voice recognition processing of the second sound information.

In the example, the voice of the first user may be acquired by the second microphone 20M. The voice of the second user may be acquired by the first microphone 10M. The suppression processing of the noise may be performed using the first sound information relating to the voice of the first user acquired by the first microphone 10M and the second sound information relating to the voice of the first user acquired by the second microphone 20M. Similarly, the suppression processing of the noise may be performed using the first sound information relating to the voice of the second user acquired by the first microphone 10M and the second sound information relating to the voice of the second user acquired by the second microphone 20M. Thereby, sound information is obtained in which the noise is suppressed.

In the embodiment, the first sound wave 10W may include a signal in which digital data is encoded. The first sound wave 10W may include a digital acoustic watermark.

The first sound wave 10W may be changed according to the spatial position of the first device 10. For example, a sound unique to a room may be used as the first sound wave 10W when the first device 10 is inside the designated room. For example, identification information is assigned to the room. The first sound wave 10W (e.g., a melody) may be modified based on the identification information of the room.

For example, unique sounds of multiple devices may be used as the first sound wave 10W.

Second Embodiment

Figure 6:
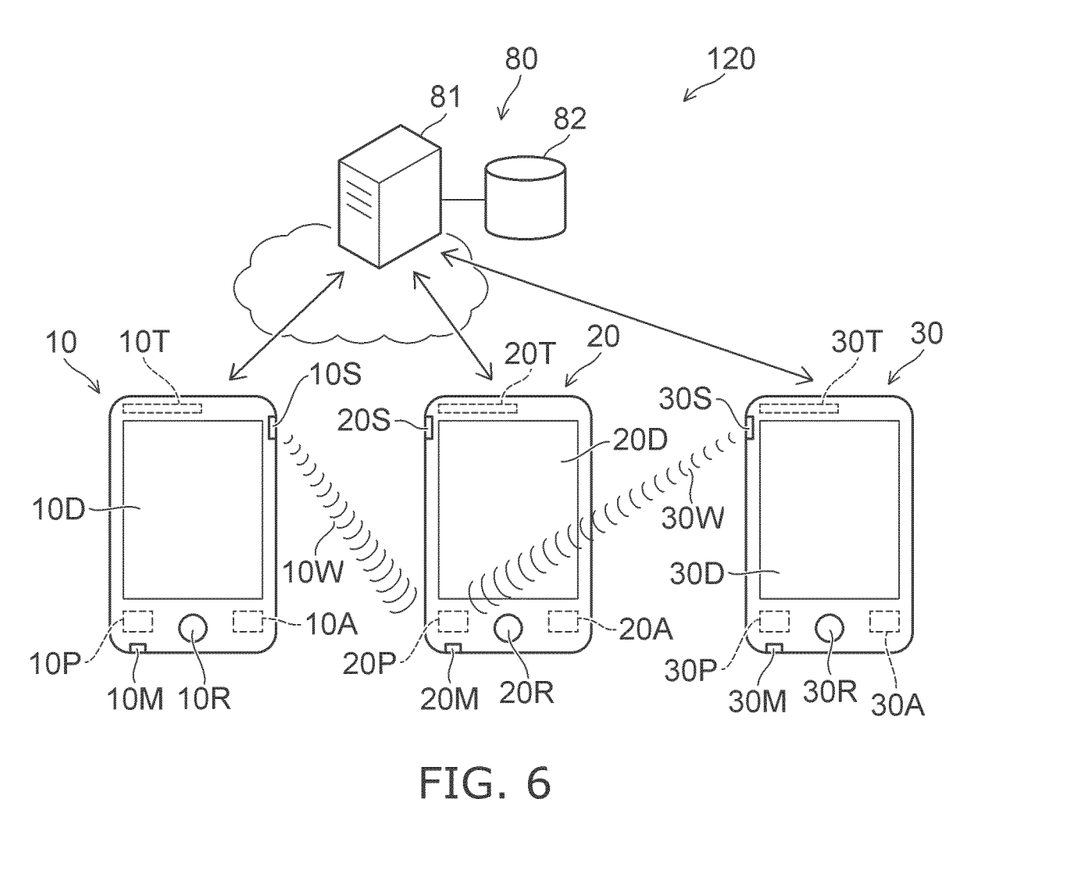
FIG. 6 is a schematic view illustrating a microphone cooperation device according to a second embodiment.

FIG. 6 is a schematic view illustrating a microphone cooperation device according to a second embodiment.

As shown in FIG. 6, the microphone cooperation device 120 according to the embodiment further includes a third device 30 in addition to the first device 10 and the second device 20.

The third device 30 includes a third microphone 30M and a third speaker 30S. The third device 30 may further include a third communicator 30T, a third memory 30A, a third processor 30P, a third displayer 30D, and a third operation receiver 30R. The components that are included in the third device 30 are similar respectively to, for example, the components included in the first device 10.

In the microphone cooperation device 120, a third sound wave 30W is emitted from the third speaker 30S. The following second action is possible in the microphone cooperation device 120. In the second action, the third device 30 joins the one group recited above when the second microphone 20M receives the third sound wave 30W emitted from the third speaker 30S.

At this time, for example, the third sound wave 30W is different from the first sound wave 10W. The arrangement (e.g., the melody) of the sound of the third sound wave 30W is different from the arrangement (e.g., the melody) of the sound of the first sound wave 10W. The users easily recognize the sound waves because the multiple sound waves are different from each other.

Figure 7:
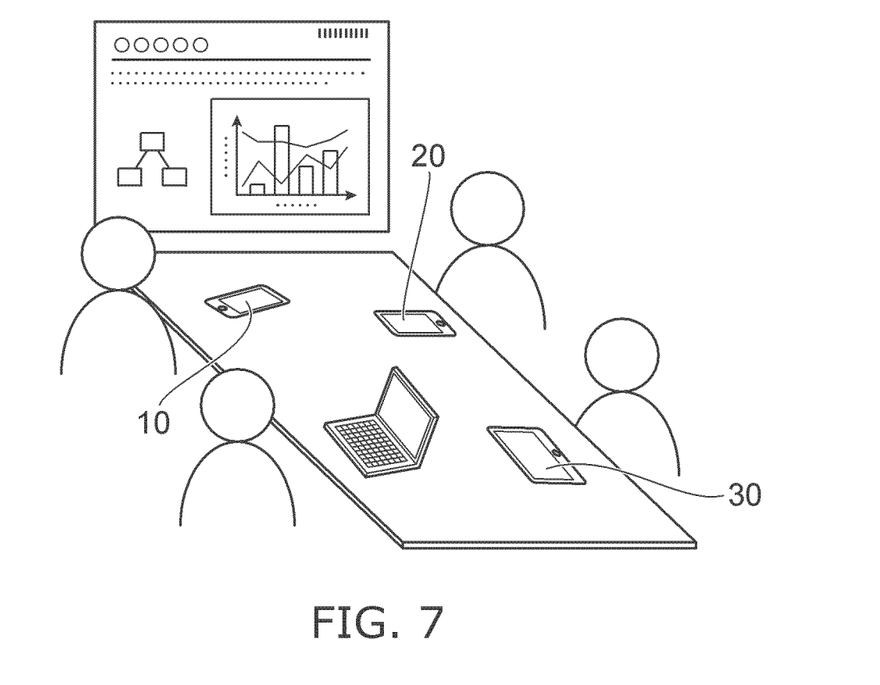
FIG. 7 is a schematic view illustrating a state of use of the microphone cooperation device according to the embodiment.

FIG. 7 is a schematic view illustrating a state of use of the microphone cooperation device according to the embodiment. As shown in FIG. 7, the users of the first device 10, the second device 20, and the third device 30 are holding a meeting, etc. In such a case, the microphone cooperation device according to the embodiment is used.

For example, the multiple microphone devices (e.g., the first device 10, the second device 20, the third device 30, etc.) and the users of the multiple microphone devices are respectively associated. For example, the multiple microphone devices are capable of communicating with each other via the cloud.

For example, the user of one microphone device (e.g., the second device 20) is participating in the meeting. For example, the second device 20 belongs to one group. For example, the second device 20 is recording the content of the meeting.

The user of another microphone device (e.g., the first device 10) newly participates in the meeting. The participants (the users) of the meeting desire that the first device 10 is newly added to the group. The first sound wave 10W is emitted from the first device 10. The first sound wave 10W is received by the second microphone 20M of the second device 20. The participation of the first device 10 in the group is authenticated. For example, the recording of the meeting by the first device 10 is started.

For example, the cooperation of the microphones is performed without adding new hardware. The cooperation of the microphones is performed without performing complex operations.

The content of the meeting is recorded by the multiple microphone devices belonging to the same group. For example, the conversations of the meeting are acquired separately. For example, the noise is suppressed. The content of the meeting can be acquired with high quality.

For example, spectral analysis of the first sound wave 10W is performed. For example, the extraction of the feature sequence is performed. For example, matching to an announcement sound lexicon that is possessed is evaluated. For example, the first device 10 joins the group if the feature sequence matches the input information of the first sound wave 10W. For example, the device may be searched for in the cloud. For example, the handshaking of the multiple devices is implemented. After the handshaking, the multiple devices can implement mutually-cooperated recording.

For example, when the second device 20 observes the first sound wave 10W, the second device 20 can cause the second user to use, for example, a GUI to select whether or not to add the transmission source of the first sound wave 10W to the meeting. Thereby, the first device 10 is authenticated.

For example, when the second device 20 observes the first sound wave 10W, the second device 20 can refer to the schedule of the first user associated with the first device 10. The reference may be performed using, for example, information in the cloud. For example, the participation of the first device 10 in the group may be implemented based on the result of the referring.

Other than meetings, the microphone cooperation device according to the embodiment may be used in a classroom, etc. The microphone cooperation device can be utilized in any circumstance. The microphone cooperation device can be utilized in any space where multiple persons (users) exist.

According to the embodiment, a microphone cooperation device can be provided in which the information can be utilized more effectively.

Hereinabove, embodiments of the invention are described while referring to examples. However, the invention is not limited to these examples. For example, one skilled in the art may similarly practice the invention by appropriately selecting specific configurations of components included in the microphone cooperation device such as the first device, the second device, the microphone, the speaker, the server, etc., from known art; and such practice is within the scope of the invention to the extent that similar effects can be obtained.

Any two or more components of the examples also may be combined within the extent of technical feasibility and are within the scope of the invention to the extent that the spirit of the invention is included.

All microphone cooperation devices practicable by an appropriate design modification by one skilled in the art based on the microphone cooperation devices described above as the embodiments of the invention also are within the scope of the invention to the extent that the spirit of the invention is included.

Various modifications and alterations within the spirit of the invention will be readily apparent to those skilled in the art; and all such modifications and alterations should be seen as being within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A microphone cooperation system, comprising:
a first device comprising a first microphone and a first speaker; and
a second device comprising a second microphone and a second speaker,
the first device and the second device configured to implement a first action of joining a group of devices when the second microphone receives a first sound wave emitted from the first speaker, the first sound wave comprising encoded digital data, wherein
the second device prompts, when the second microphone receives the first sound wave, a first operator of the second device to select whether to implement the first action by displaying a first image and a second image,
the first action is implemented when the second device acquires information that implementation of the first action has been authorized by the first operator, the authorization indicated by a selection of the first image,
at least one of the first device or the second device is not included in the group before the second device acquires the information that implementation of the first action has been selected by the first operator,
the first action is implemented without using electromagnetic wave.

2. The system according to claim 1, wherein a frequency of the first sound wave is between 20 Hz and 20 kHz.

3. The system according to claim 1, wherein a frequency of the first sound wave is greater than 20 kHz.

4. The system according to claim 1, wherein emission of the first sound wave is initiated when the first device receives an operation of a second operator.

5. The system according to claim 1, wherein emission of the first sound wave is initiated based at least in part on at least one of a time, information relating to a position of the first device, a schedule of a second operator of the first device, information relating to a distance between the first device and the second device, or information relating to a past communication history between the first device and the second device.

6. The system according to claim 1, wherein the first action is implemented based at least in part on at least one of a time when the second microphone receives the first sound wave, a schedule of a second operator of the first device, a schedule of the first operator of the second device, or information relating to a past communication history between the first device and the second device.

7. The system according to claim 6, wherein the second device determines implementation of the first action based at least in part on the at least one of the time when the second microphone receives the first sound wave, the schedule of the second operator of the first device, the schedule of the first operator of the second device, or the information relating to the past communication history between the first device and the second device.

8. The system according to claim 1, further comprising a server configured to communicate with the first device and the second device,
at least a portion of the first action being controlled by the server.

9. The system according to claim 1, wherein
identification information provided to the group of devices adds to first sound information relating to a first sound acquired by the first microphone after joining the group of devices, and
the identification information adds to second sound information relating to a second sound acquired by the second microphone after joining the group of devices.

10. The system according to claim 1, wherein
first sound information relating to a first sound acquired by the first microphone after joining the group of devices is stored in the device, and
second sound information relating to a second sound acquired by the second microphone after joining the group of devices is stored in the device.

11. The system according to claim 1, wherein processing-information is output, wherein the processing-information is obtained by processing first sound information relating to a first sound acquired by the first microphone after joining the group of devices and second sound information relating to a second sound acquired by the second microphone after joining the group of devices.

12. The system according to claim 11, wherein the processing of the first sound information and the second sound information comprises removing at least a portion of noise.

13. The system according to claim 11, wherein the processing-information comprises first text information and second text information, the first text information is obtained by voice recognition processing of the first sound information, the second text information is obtained by voice recognition processing of the second sound information.

14. The system according to claim 1, wherein the first sound wave comprises a digital acoustic watermark.

15. The system according to claim 1, wherein the first sound wave changes according to a spatial position of the first device.

16. The system according to claim 1, further comprising a third device comprising a third microphone and a third speaker,
wherein the third device is configured to implement a second action of joining the group of devices when the second microphone receives a third sound wave emitted from the third speaker,
wherein the third sound wave is different from the first sound wave.

17. The system according to claim 1, wherein a sound power of the first sound wave is between $1 \times 10^{-7}$ W/m2 and $1 \times 10^{-4}$ W/m2.

* * * * *